(12) United States Patent
Dingwerth (10) Patent No.: US 9,578,813 B2
(45) Date of Patent: Feb. 28, 2017

(54) RAPID DEPLOYMENT PLANT PROTECTOR

(71) Applicant: Jerome Dingwerth, Laytonville, CA (US)

(72) Inventor: Jerome Dingwerth, Laytonville, CA (US)

( * ) Notice: Subject to any disclaimer, the term of this patent is extended or adjusted under 35 U.S.C. 154(b) by 171 days.

(21) Appl. No.: 14/308,340

(22) Filed: Jun. 18, 2014

(65) Prior Publication Data

US 2015/0366145 A1    Dec. 24, 2015

(51) Int. Cl.
  *E04H 15/28*  (2006.01)
  *A45B 25/02*  (2006.01)
  *A01G 13/02*  (2006.01)
  *A01G 13/00*  (2006.01)

(52) U.S. Cl.
  CPC .......... *A01G 13/0206* (2013.01); *A45B 25/02* (2013.01); *E04H 15/28* (2013.01)

(58) Field of Classification Search
  CPC ......... E04H 15/18; E04H 15/26; E04H 15/28; E04H 15/58; E04H 15/64; A45B 25/02; A45B 25/06; A45B 25/08; A45B 25/10; A45B 2023/0012; A45B 25/01; A01G 13/02; A01G 13/04; A01G 13/043; A01G 13/046; A01G 13/0206
  USPC ...... 135/97–98, 115, 119, 28–30, 33.2–33.6; 47/44, 47, 20.1, 23.1, 23.2, 29.5–29.6, 47/65.9; 403/217–219
  See application file for complete search history.

(56) References Cited

U.S. PATENT DOCUMENTS

| | | | | |
|---|---|---|---|---|
| 2,715,537 A * | 8/1955 | Hofheimer | ................ | E04G 7/22 403/173 |
| 4,061,154 A * | 12/1977 | Cox | ........................ | A45B 25/18 135/33.41 |
| 4,677,796 A * | 7/1987 | Mellott | .................. | E04B 1/3416 135/99 |
| 4,766,919 A * | 8/1988 | Crates | .................... | A45B 23/00 135/97 |
| 5,488,966 A * | 2/1996 | Baldwin | ................ | A45B 25/18 135/15.1 |
| 5,797,695 A * | 8/1998 | Prusmack | ............... | E04H 15/32 135/145 |
| 5,927,310 A * | 7/1999 | Lin | ......................... | A45B 23/00 135/20.1 |
| 5,930,948 A * | 8/1999 | Daniel | .................... | A01G 13/10 135/158 |
| 6,604,844 B2 * | 8/2003 | Hussey | .................... | E04H 15/28 135/147 |
| 7,178,535 B2 | 2/2007 | Eder | | |
| 7,497,048 B2 | 3/2009 | Bakowski | | |
| 8,161,680 B1 | 4/2012 | Sloan et al. | | |
| 8,166,986 B2 | 5/2012 | Ma | | |

(Continued)

FOREIGN PATENT DOCUMENTS

JP            04011821 A  *  1/1992

*Primary Examiner* — Winnie Yip
(74) *Attorney, Agent, or Firm* — Craig M. Stainbrook; Stainbrook & Stainbrook, LLP (57) ABSTRACT

A rapid deployment plant protector having a polygonal umbrella cover having closed sleeves on a first side, open sleeves on an opposing side, and connection structure for joining an edge of a first of said polygonal umbrella cover with an edge of an adjoining polygonal umbrella cover; an umbrella hub; a plurality of cover stays corresponding in number to the number of said sleeves; and a vertical support on which said umbrella hub is disposed.

12 Claims, 12 Drawing Sheets

(56) References Cited

U.S. PATENT DOCUMENTS

| | | | |
|---|---|---|---|
| 8,991,412 B2* | 3/2015 | Holland | E04H 15/28 135/31 |
| 2004/0226592 A1* | 11/2004 | Nipke | A45B 3/04 135/33.4 |
| 2006/0291952 A1* | 12/2006 | Wood | E04B 1/3211 403/217 |
| 2014/0246062 A1* | 9/2014 | Ma | A45B 25/10 135/19.5 |

* cited by examiner

RAPID DEPLOYMENT PLANT PROTECTOR

CROSS REFERENCES TO RELATED APPLICATIONS

Not applicable. The present application is an original and first-filed United States Utility Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present invention relates generally to plant protection apparatus, and more particularly to protective plant covers, and still more particularly to a hub for a rapid deployment umbrella-like protective plant cover that may be adjusted to deploy at different heights and with a different coverage area so as to adapt to plants as they grow.

Background Discussion

Plant covers of numerous kinds are known, including umbrella-like structures adapted for rapid deployment over one or more plants. Art relevant to the consideration of background for the present invention includes:

U.S. Pat. No. 8,161,680, to Sloan et al, which teaches a collapsible umbrella-type summer and winter plant protector. The cover includes a drawstring on its bottom perimeter to allow it to be tied around the bottom portion of a plant. The cover can be anchored to the ground using spikes disposed on the ends of the umbrella arms.

U.S. Pat. No. 7,497,048, to Bakowski, which discloses a tent-like plant protector including a flexible cover, a base, sides and plural vertices defining intersections between adjacent sides, and elongated frame members attached to the cover at one of the vertices. The frame members pivot into a deployment configuration wherein the frame members open position and sufficiently spread apart to form a plant-receiving interior region. The plant protector also has a stowage configuration wherein the frame members are in the collapsed position.

U.S. Pat. No. 8,166,986, to Ma and U.S. Pat. No. 7,178,535 to Eder, which each teach improved hubs for umbrella-like shade structures.

The shortcoming in the prior art is that the frame elements are coupled to the hub in a generally permanent manner and thereby limit the size of the area protected by the cover.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention when such claims are presented in a regular national utility patent application claiming the benefit of the filing date of the instant application. However, it is respectfully submitted that none of the above-indicated patents disclose, teach, suggest, show, or otherwise render obvious, either singly or when considered in combination, the invention described herein.

BRIEF SUMMARY OF THE INVENTION

The present invention is a rapid deployment plant protector having a polygonal umbrella cover having closed sleeves on a first side, open sleeves on an opposing side, and connection structure for joining an edge of a first polygonal umbrella cover with an edge of an adjoining polygonal umbrella cover; an umbrella hub; a plurality of cover stays corresponding in number to the number of sleeves; and a vertical support on which the umbrella hub is disposed.

Using a plurality of the plant protectors of the present invention, a user can rapidly deploy the apparatus to cover one or more rows of plants that might be damaged by weather elements—rain, frost, or sun. The user merely needs to deploy the apparatus on their respective vertical supports, bringing the edges of adjoining plant protector umbrella covers into proximity with one another; and then connect the edges of adjoining plant protectors using the connection structures. Linear rows or irregular planting arrangements can be covered.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, it is to be understood that the disclosure is not limited in its application to the details of the construction and the arrangements set forth in the following description or illustrated in the drawings. The inventive apparatus described herein is capable of other embodiments and of being practiced and carried out in various ways. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
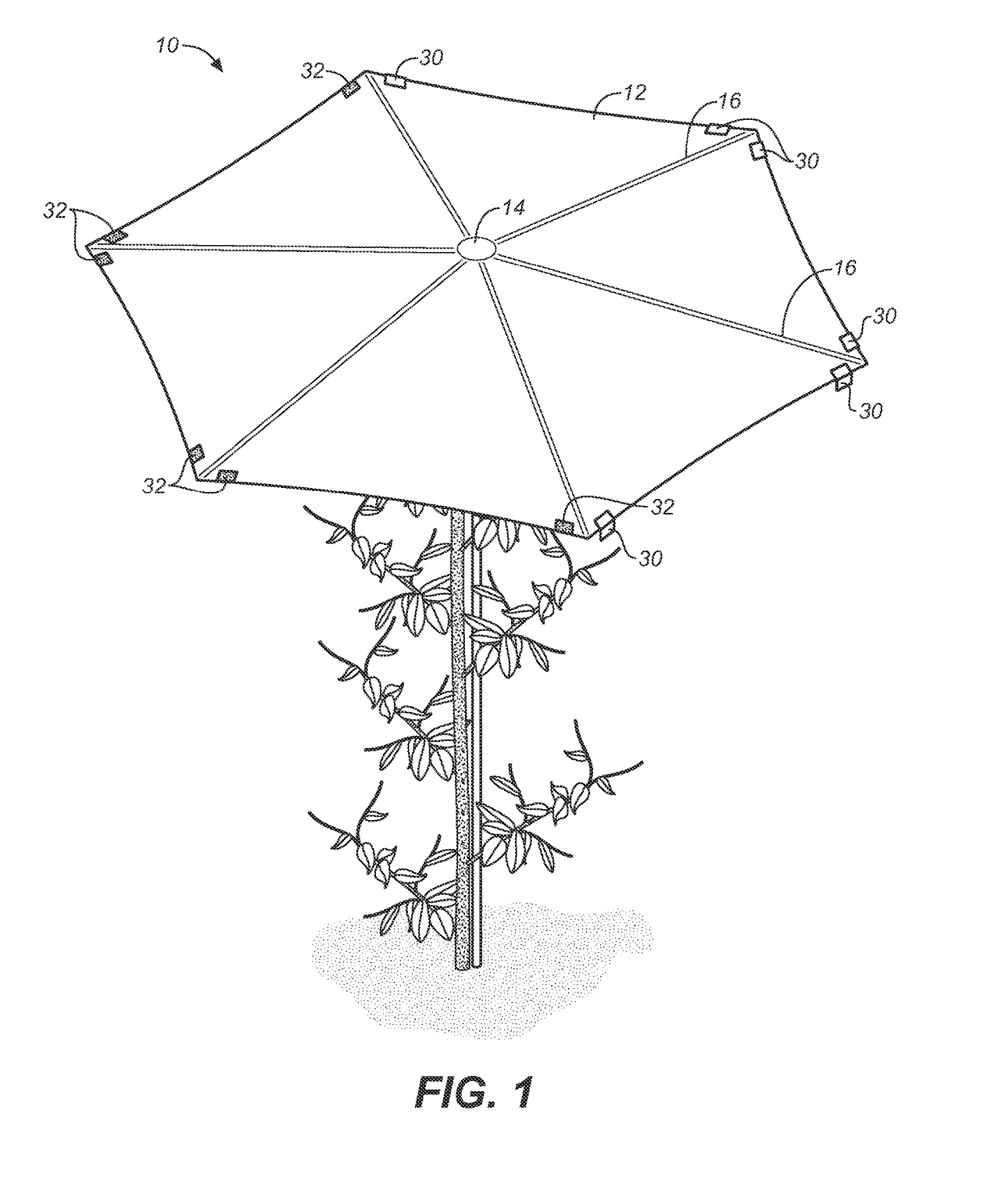
FIG. 1 is an upper perspective view showing the inventive plant cover installed proximate and over a plant.
Figure 2:
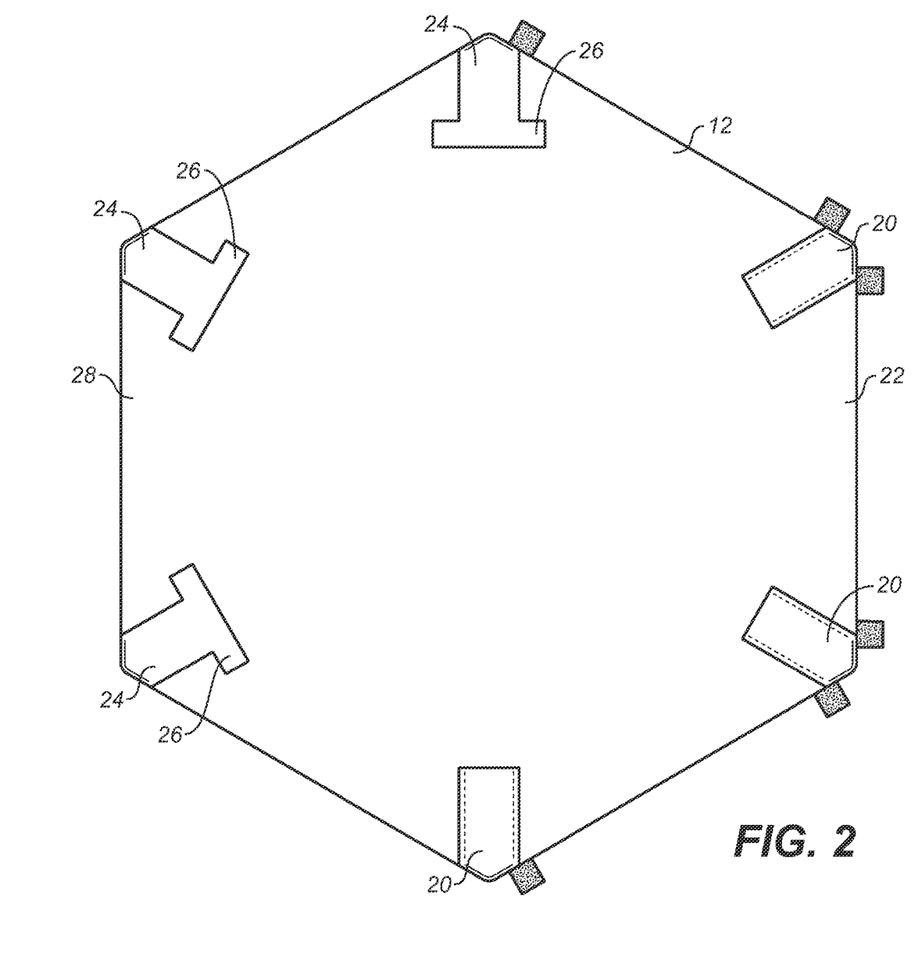
FIG. 2 is a bottom plan view showing the panel or cover portion of the inventive apparatus.
Figure 3:
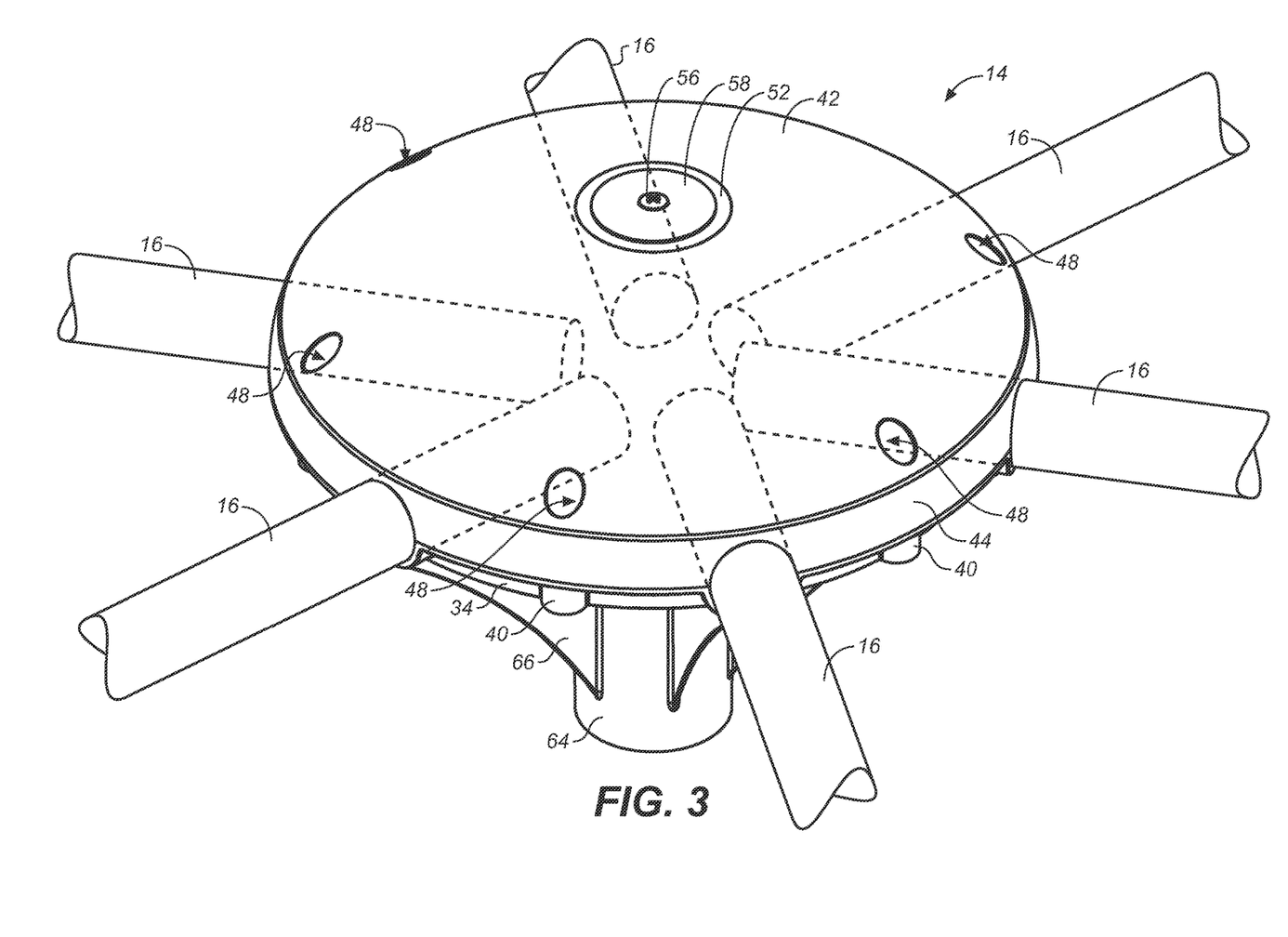
FIG. 3 is an upper perspective view showing the hub that forms the both the geometric and structural center of the present invention.
Figure 4:
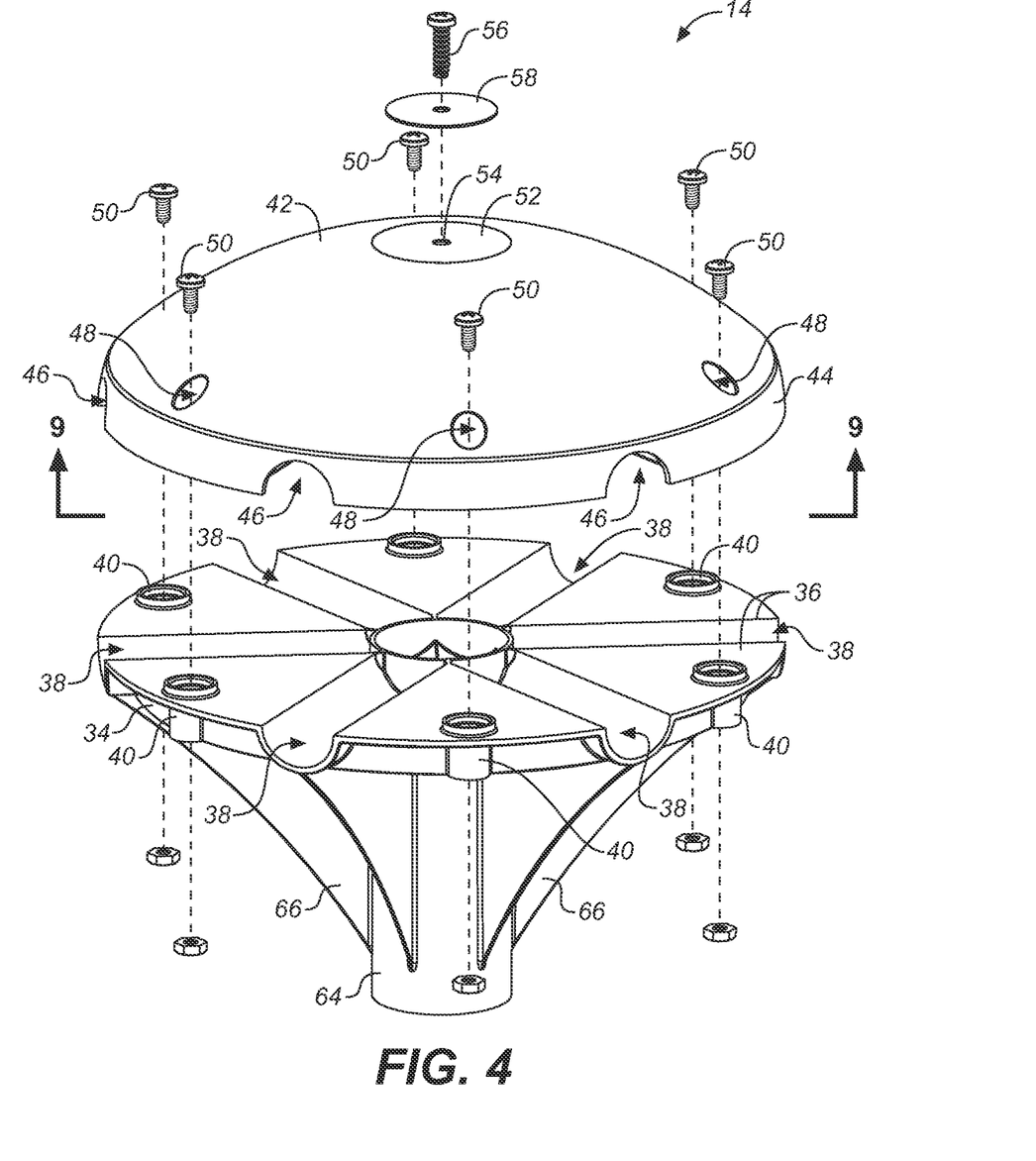
FIG. 4 is an exploded upper perspective view thereof.
Figure 5:
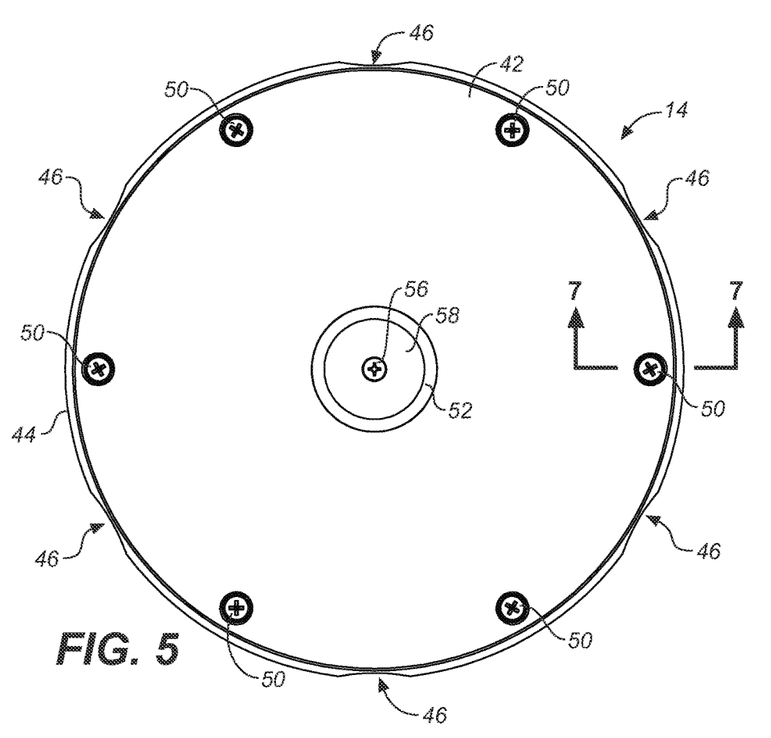
FIG. 5 is a top plan view thereof.
Figure 6:
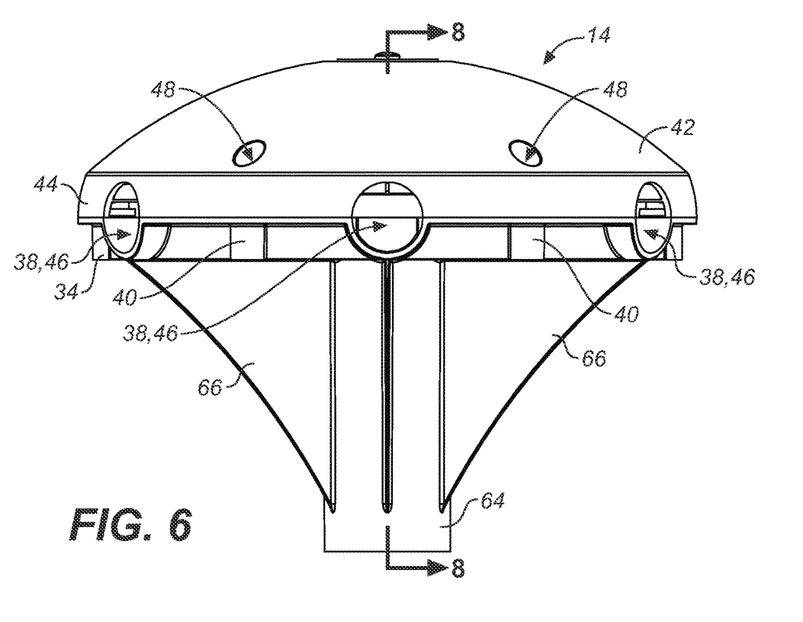
FIG. 6 is a side view in elevation thereof.
Figure 7:
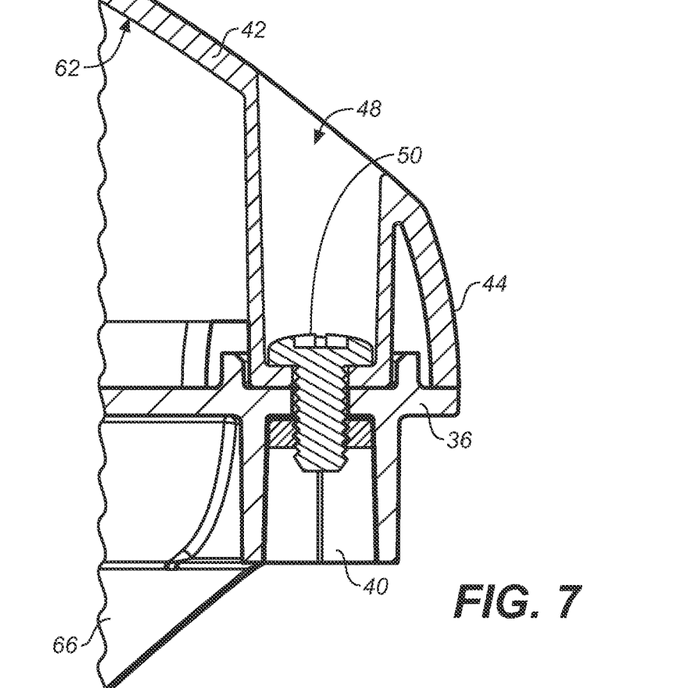
FIG. 7 is a cross-sectional side view in elevation taken along Section Lines 7-7 of FIG. 5, showing the cap and base connection.
Figure 8:
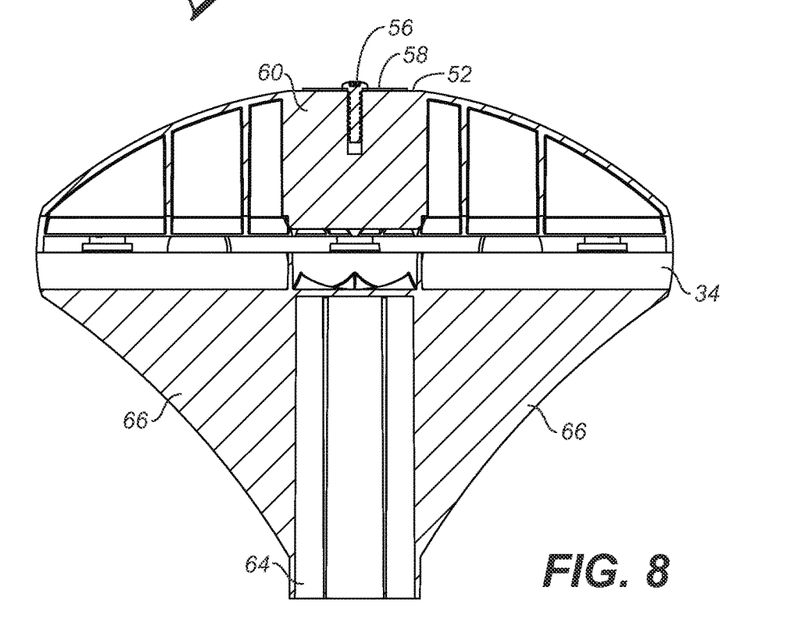
FIG. 8 is a cross-sectional side view in elevation taken along Section Lines 8-8 of FIG. 6.
Figure 9:
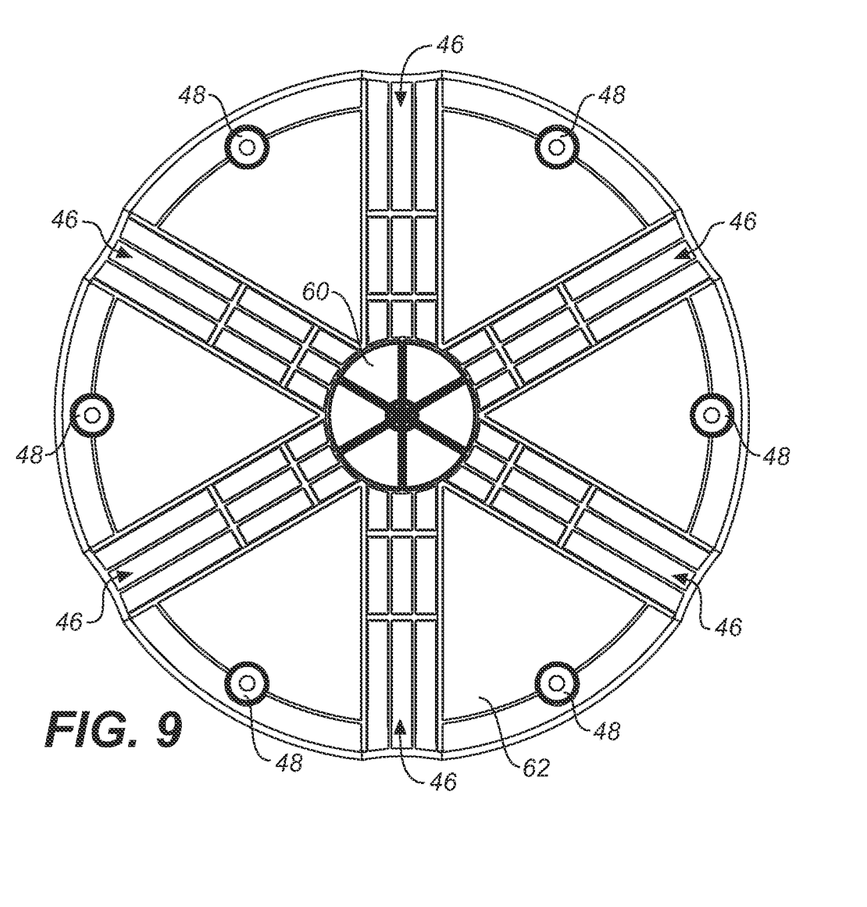
FIG. 9 is a bottom plan view of the underside of the cap.

Referring first to FIGS. 1-2, wherein like reference numerals refer to like components in the various views, there is illustrated therein a new and improved plant cover apparatus and a hub for the same, the inventive cover generally denominated 10 herein. The views collectively illustrate a first preferred embodiment for practicing the inventive apparatus. They show that the invention is an assembly that most essentially includes a polygonal umbrella cover 12 (preferably, square, rectangular, hexagonal or octagonal in shape, though other shapes, including triangular are possible, though less easy to deploy), a versatile umbrella hub 14, a plurality of cover stays 16 (the number corresponding to the number of vertices in the polygonal cover), and a vertical support 18.

The edges and/or corners of the polygonal cover 12 includes closed sleeves or pockets 20 at each corner or vertex on a first half 22 of the cover, and open sleeves 24 with closures, preferably flaps 26 (and still more preferably hook and loop in nature) on each vertex of an opposing, second half 28 of the cover. It will be appreciated that cable ties, rope or twine, snaps, hooks-and-eyes, buttons, zippers, wires, and numerous other clasps and closures will provide the functional objective sought (namely, closure means). Edge flaps 30, preferably bearing one side of a hook and loop material 30a, are provided on one half of the cover to connect to complementary surface elements 32 on the other half. Looking ahead to FIGS. 10 and 11, it will be appreciated that this enables a user to approximate the sides of the covers with the sides of adjoining covers and connect the closure means (e.g., complementary hook and loop materials) so as to couple and gang covers installed over nearby plants, thereby providing a substantially contiguous and continuous cover over a large planted area. While hook and loop material flaps are a preferred means for accomplishing the connection of adjoining umbrella covers, as with the closure means, other connection means may also be employed, including, without limitation, cable ties, rope or twine, snaps, hooks-and-eyes, buttons, zippers, wires, and numerous other clasps and connectors.

As will be appreciated by those will skill in the art, the cover may be fabricated from any of a number of suitable materials, including cloth fabrics (such as cotton canvas) or synthetic or synthetic blend fabrics (such as polyester canvas), plastics (such as polyethylene), MYLAR®, vinyl, nylon, acrylic, neoprene, and so forth, though preferable materials will generally allow for either transparency or complete opacity, as the needs of the user dictate. [MYLAR® is a registered trademark of E. I. du Pont de Nemours and Company, of Wilmington, Del.]

FIGS. 3-8 show the hub 14 that resides at the conceptual and physical heart of the inventive apparatus. This hub includes a base 34 having a generally planar top side 36 with evenly spaced hemispherical lower channels 38 corresponding in number to the number of sides in the cover adapted for use with the hub. A plurality of threaded mounting bosses 40 are disposed around the perimeter of the top side for use in accepting fasters to secure a cap 42.

The cap is preferably a dome having a downwardly depending perimeter wall 44 with a plurality of hemispherical upper channels 46 that align with the hemispherical lower channels 38 so as to create cylindrical sleeves into which plastic (PVC) pipe are captured and from which they extend radially (in the manner of spokes) from the center of the hub so as to function as stays 16 for the cover.

The cap 42 further includes a plurality of threaded screw holes 48 that align with the bosses 40 on the base 34 such that screws 50 can be threadably inserted to secure the cap to the base. A flattened center portion 52 on the surface of the generally dome-shaped cap includes a screw hole 54 into which a screw and washer combination, 56/58 can be installed, the screw hole bored into a shaft 60 depending from the lower surface 62 of the cap. This assembly can be employed to secure and center the cover 12.

Other salient elements of the base 34 include a vertically disposed hollow cylindrical support tube 64 for receiving the end of a vertical support 18 and reinforcement ribbing 66, which makes the connection between the support tube and the base.

Figure 10:
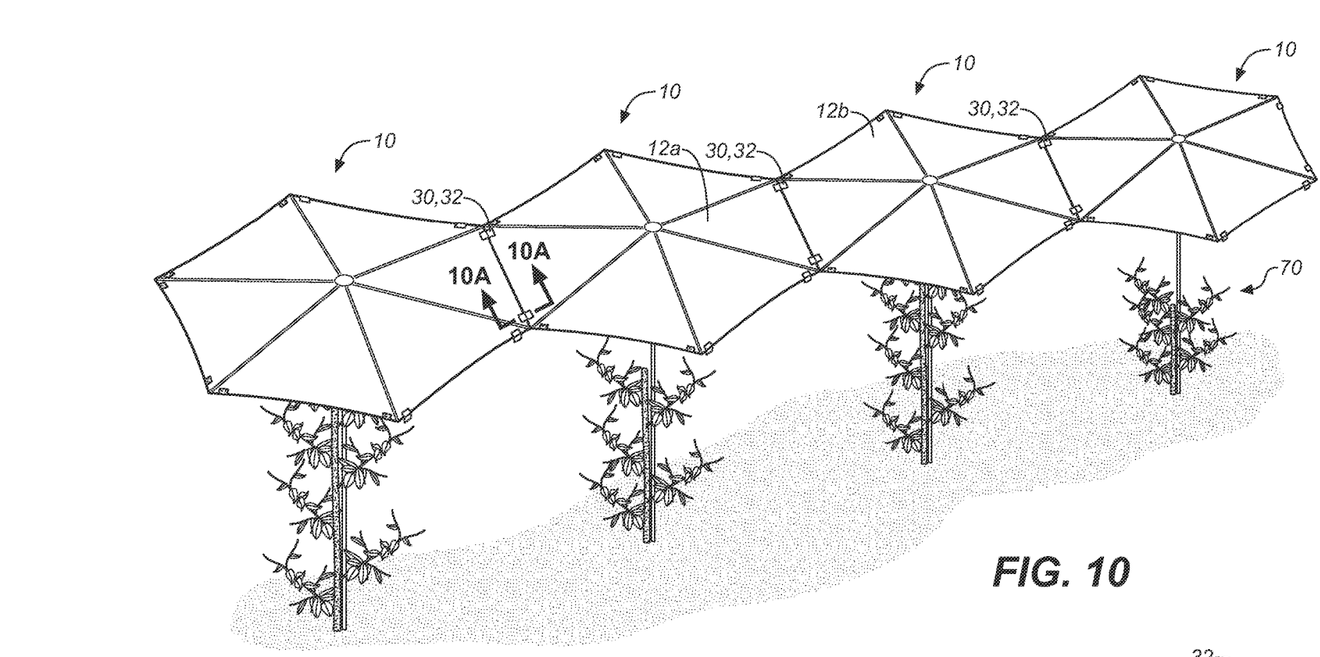
FIG. 10 is an upper perspective view showing a plurality of the inventive plant covers arrayed in a row over a row of plants.
Figure 10A:
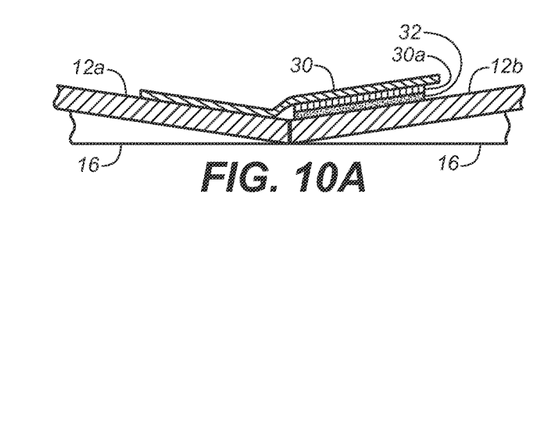
FIG. 10a is a detailed cross-sectional side view in elevation taken along Section Line 10A-10A of FIG. 10.
Figure 11:
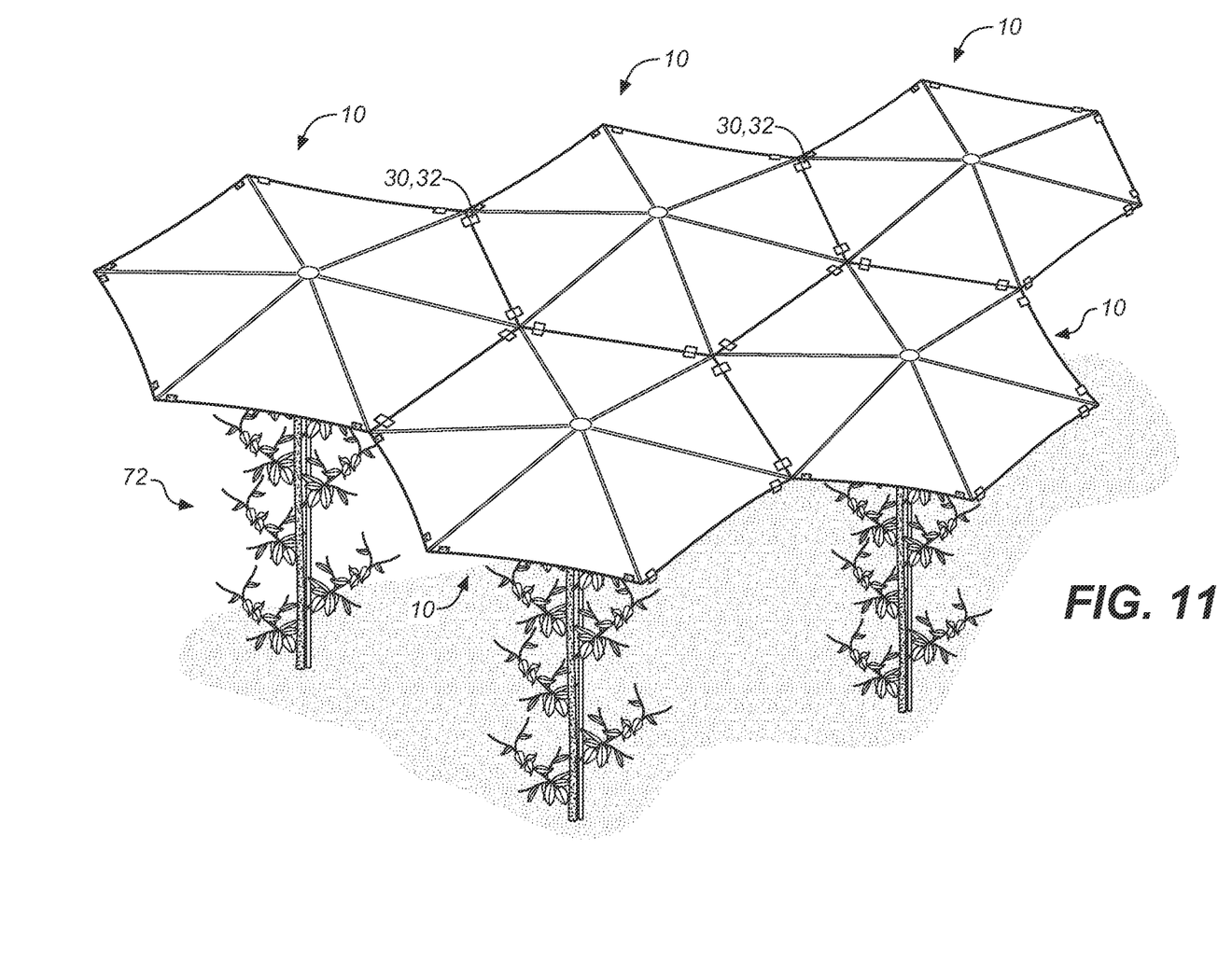
FIG. 11 is an upper perspective view showing a plurality of the inventive plant covers installed over several adjoining rows of plants.

Turning next to FIGS. 10-11, there is shown two potential applications for the instant invention, including use to cover a single row 70 of plants (FIG. 10) and to cover adjoining rows of plants 72 (FIG. 11). FIG. 10A shows how the cover 12 edges are approximated and connected using a flap 30 on one cover 12a having hook and loop material mated to a patch 32 of complementary hook and loop material on an adjoining cover 12b. As should be clear from the views, the ability to join the edges of adjoining covers allows a user to cover nearly any configuration of crop plantings.

Figure 12:
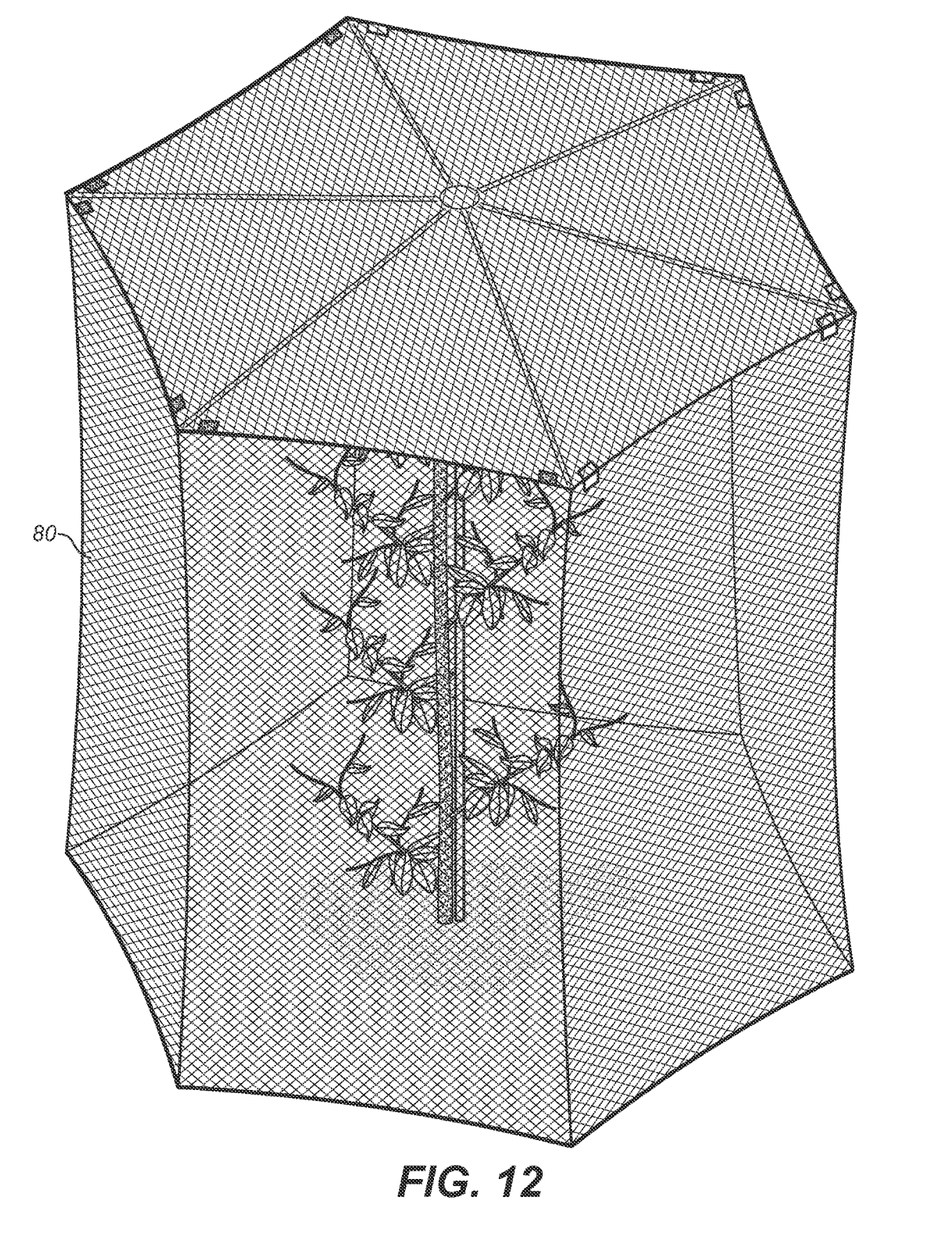
FIG. 12 is an upper perspective view showing the plant cover including side panels of netting or mesh to prevent bug and bird infestation.

Finally, and next referring to FIG. 12, there is shown yet another application of the present invention, namely to function as the scaffold on which to hang a bird or insect net or a frost prevention drape 80.

Figure 13:
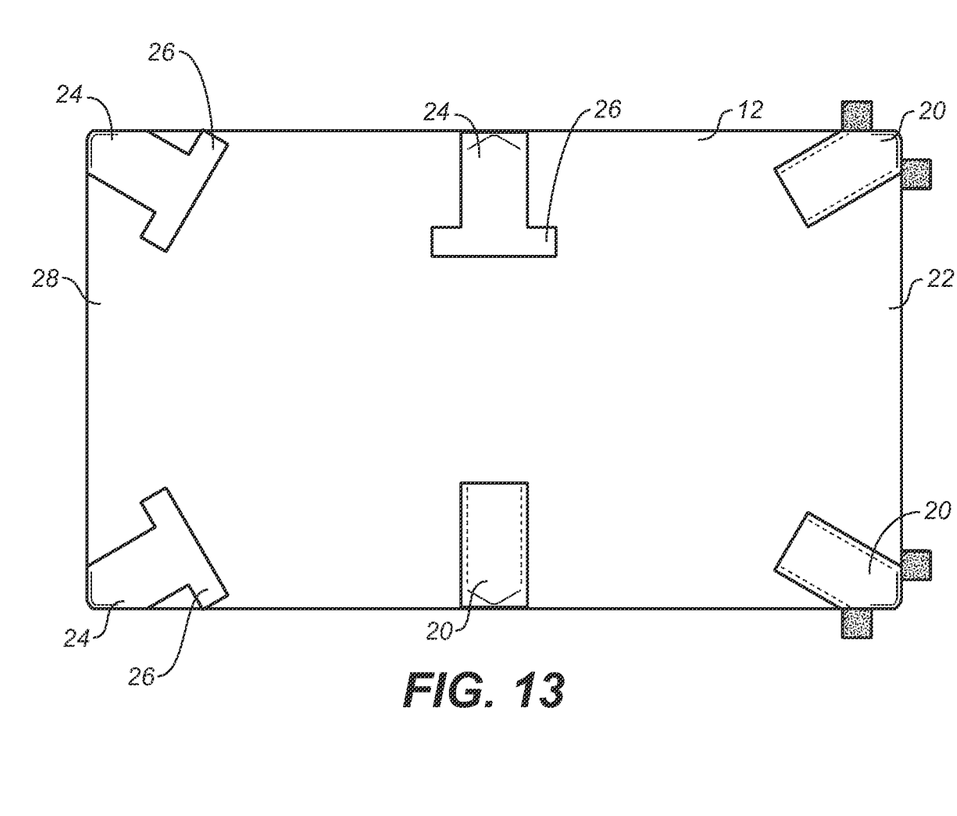
FIG. 13 is a top plan view showing an alternative geometry for the polygonal umbrella cover, in this instance, a rectangle.
Figure 14:
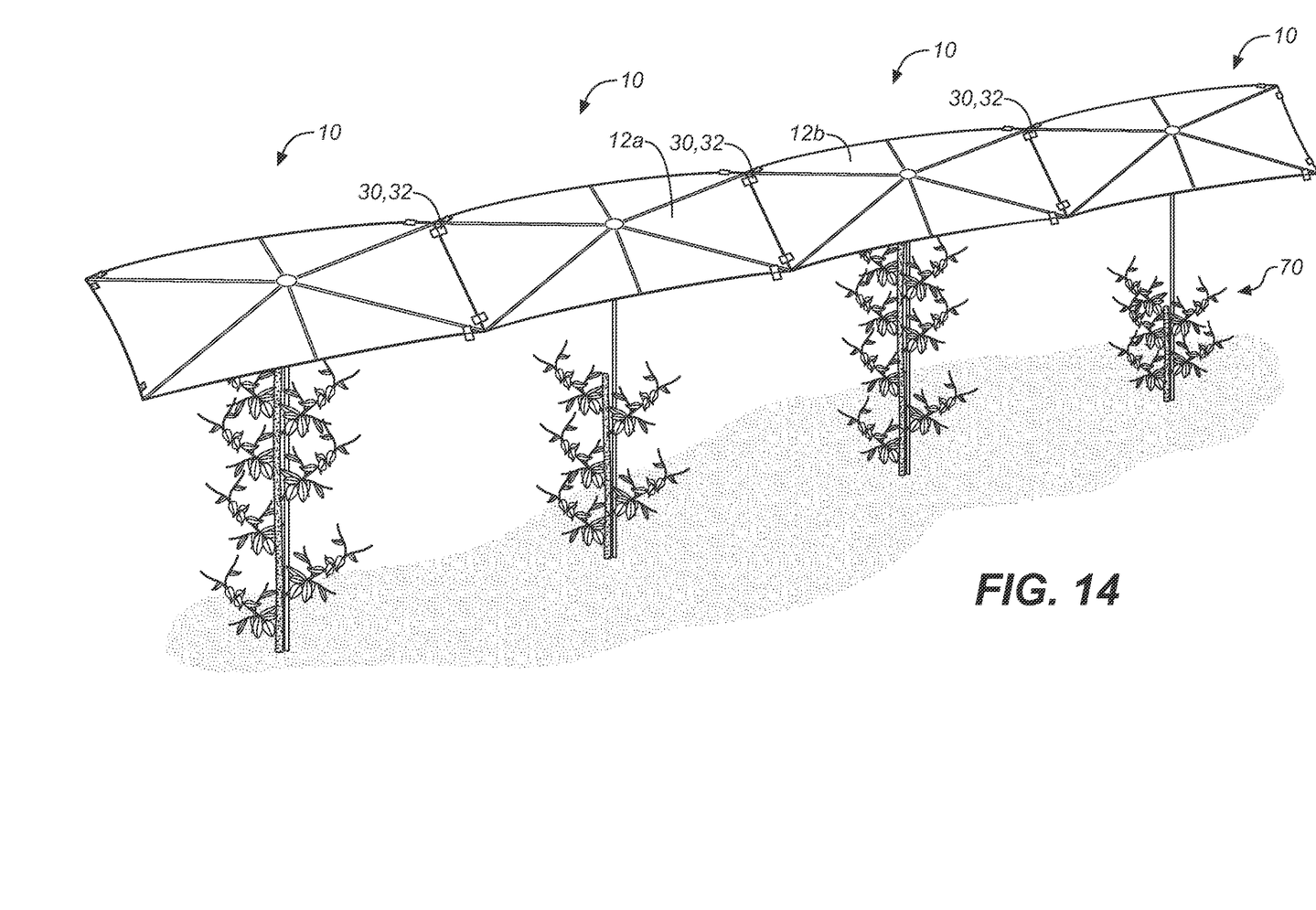
FIG. 14 shows the rectangular cover deployed in a linear array.

FIGS. 13-14 show an alternative cover geometry, in this instance a rectangular cover 12. The cover stays (16 in the previous views) are modified by providing stays of differential lengths which extend into the closed and open sleeves 20, 24, respectively for cover deployment. In all other respects, this alternative cover includes the features and functions of the earlier described embodiment. Advantageously, when deployed in linear arrays, or rows, such as seen in FIG. 14, this panel configuration does not form valleys or troughs or other material depressions where water can collect and place a load on the covers and their support hardware.

From the foregoing it will be appreciated that in its most essential aspect, the present invention is a rapid deployment plant protector, comprising a polygonal umbrella cover having closed sleeves on a first side, open sleeves on an opposing side, and connection structure for joining an edge of a first of said polygonal umbrella cover with an edge of an adjoining polygonal umbrella cover; an umbrella hub; a plurality of cover stays corresponding in number to the number of said sleeves; and a vertical support on which said umbrella hub is disposed.

From the foregoing, it is also clear that by using the plant protector of the present invention, there is also provided a method of protector plants with a rapidly deployed and rapidly removed plant protector assembly, comprising the steps of: providing a plant protector that includes a polygonal umbrella cover having closed sleeves on a first side, open sleeves on an opposing side, and connection structure disposed on at least one edge of the umbrella cover for joining an edge of a first of said polygonal umbrella cover with an edge of an adjoining polygonal umbrella cover, an umbrella hub, a plurality of cover stays corresponding in number to the number of said sleeves, and a vertical support on which said umbrella hub is disposed; supporting a plurality of protectors, each deployed on a vertical support; bringing the edges of adjoining plant protector umbrella covers into proximity; and connector the edge of adjoining plant protectors using the connection structures.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which will be defined by claims filed in a related non-provisional patent application claiming the benefit of the filing date of the instant application.

What is claimed as invention is:

1. A rapid deployment plant protector, comprising:
   a polygonal umbrella cover having closed sleeves on a first side and open sleeves on an opposing side;
   an umbrella hub;
   a plurality of cover stays corresponding in number to the number of said sleeves, each of said stays having a proximal end affixed to said hub and extending radially outward from said hub to a distal end secured in one of said sleeves so as to provide structure to support said cover; and
   a vertical support on top of which said umbrella hub is fixedly disposed, wherein said hub includes a base having a top side with hemispherical channels corresponding in number to the number of said sleeves, and a cap with a lower side having hemispherical channels matching those of said base, and securing structures for securing said cap to said base so as to form cylindrical openings for slidable insertion and capture of said stays to facilitate rapid assembly and disassembly and rapid deployment.

2. The plant protector of claim 1, wherein said polygonal umbrella cover is selected from the geometric shapes consisting of a square, rectangular, triangular, hexagonal, and octagonal.

3. The plant protector of claim 1, wherein said open sleeves include closure means.

4. The plant protector of claim 3, wherein said closure means comprises hook and loop closure flaps.

5. The plant protector of claim 3, wherein said closure means is selected from the group consisting of cable ties, clasps, hook-and-eyes, snaps, buttons, wires, and hook and loop fasteners.

6. The plant protector of claim 1, wherein said sleeves include a plurality of said open sleeves on a first half of said cover and a plurality of said closed sleeves on a second, opposing half of said cover.

7. The plant protector of claim 6, further including connector means for joining at least one edge of said polygonal umbrella cover with an edge of an adjoining polygonal umbrella cover.

8. The plant protector of claim 7, wherein said connector means is selected from the group consisting of hook and loop flaps, cable ties, rope or twine, snaps, hooks-and-eyes, buttons, zippers, and wires.

9. The plant protector of claim 1, further including connector means for joining at least one edge of an umbrella cover with an edge of an adjoining umbrella cover.

10. The plant protector of claim 9, wherein said connector means is selected from the group consisting of hook and loop flaps, cable ties, rope or twine, snaps, hooks-and-eyes, buttons, zippers, and wires, wherein a user may couple and gang adjoining umbrella covers to provide a contiguous and continuous cover over a large planted area.

11. The plant protector of claim 1, wherein said cap includes a surface having a center portion with a screw hole into which a screw and washer combination may be are disposed to secure and center said umbrella cover to said cap.

12. The plant protector of claim 1, wherein said base includes a receptacle for receiving said vertical support.

* * * * *